April 24, 1962 F. PETERS 3,031,517
PERMANENTLY SEALED GAS-TIGHT ACCUMULATOR
Filed June 18, 1958 3 Sheets-Sheet 1

INVENTOR.
FREIMUT PETERS
BY
Mestern & Rollin
ATTORNEYS

United States Patent Office 3,031,517
Patented Apr. 24, 1962

3,031,517
PERMANENTLY SEALED GAS-TIGHT
ACCUMULATOR
Freimut Peters, Hagen, Westphalia, Germany, assignor to Accumulatoren-Fabrik A.G., Hagen, Westphalia, Germany
Filed June 18, 1958, Ser. No. 742,912
Claims priority, application Germany May 24, 1954
8 Claims. (Cl. 136—6)

The present invention relates to a permanently sealed gas-tight accumulator. It is a continuation-in-part of my copending application, Serial No. 510,871, now abandoned.

It has been found that an alkaline accumulator can be operated while being sealed in a gas-tight and liquid-tight manner by providing for an immobilized electrolyte in porous separators which cover the electrodes facing each other. Due to this arrangement, parts of the negative electrodes are no longer moistened by the electrolyte and are thus exposed so that oxygen evolved during charging of the storage battery can get into contact with these electrodes. In that case, there is no necessity of providing a higher charging capacity for the negative electrode than for the positive electrode at the time of sealing the accumulator, a provision which was believed to be indispensible according to opinions generally held in the art.

One embodiment of the present invention will be explained with the aid of the accompanying drawings, but it should be understood that these are given merely by way of explanation, not of limitation, and that many changes may be made in the details without departing from the spirit of the present invention.

In the drawings,

FIG. 1 shows the vertical section of a storage battery during its formation;

FIG. 2 the horizontal section of the same;

FIG. 3 shows the vertical section of the battery after gas-tight sealing;

FIG. 4 the horizontal section of the same;

Figure 1:
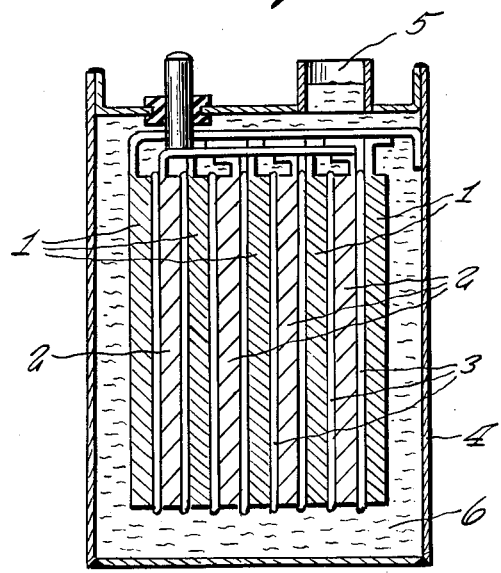
Figure 3:
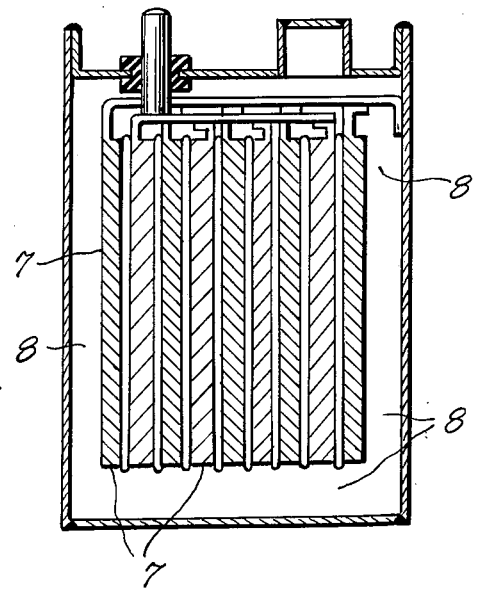
Figure 2:
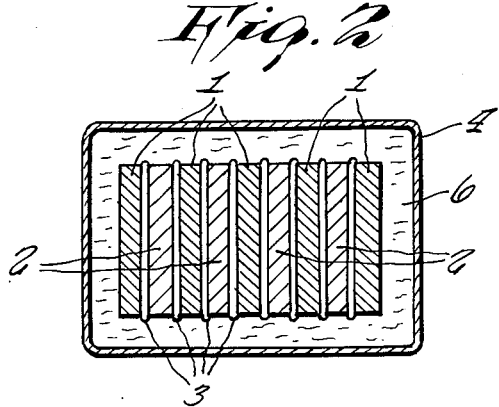
Figure 4:
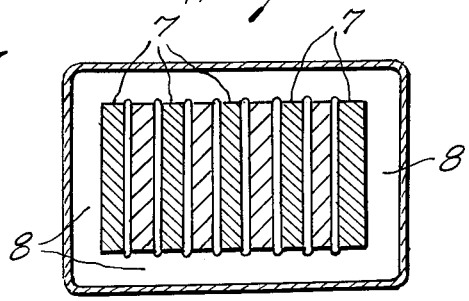

The negative electrode 1 and the positive electrode 2 are separated by porous separators 3. The latter, according to the present invention, have pores so fine that their capillary action keeps them filled constantly with electrolyte, so that gas bubbles evolved on the electrodes can not enter into these pores. The electrodes are disposed in the battery case 4 which is provided with an inlet 5. The latter is kept open during the formation, i.e. when both electrodes are charged completely. This formation is carried out over an extended period of time during which the electrodes are fully enveloped by the electrolyte 6 so that all voids in the accumulator are filled. The freely movable electrolyte 6, according to the present invention, is removed from the battery case after the electrodes have been charged completely or after discharge, and the inlet 5 is hermetically closed. The only electrolyte left in the accumulator is that remaining in the electrode pores and in the separator pores due to capillary action. Due to the removal of the freely moving electrolyte 6, portions of the negative electrodes 7 are bared, i.e., they are no longer moistened by the freely moving electrolyte, but are merely finely coated with electrolyte and are in contact with the gas space 8 present in the cell, as shown in FIGS. 3 and 4.

While the principle of the present invention pertains to all alkaline storage batteries, a preferred embodiment is that in which the negative electrode consists of cadmium, the positive electrode of nickel hydroxide, and the electrolyte of an aqueous potassium hydroxide solution having a density of 1.2. The nickel hydroxide is carried by a carrier, which may be of nickel or a nickel plated metal and consists of sintered metal powder or pockets of perforated metal sheets.

The object of the present invention is to produce gas-tight accumulators which are constructed in such a manner that during charging only oxygen is evolved which, by contact with the bared portion of the negative electrode, is removed by electrochemical reaction. In this point, the accumulators according to the present invention differ in principle from U.S. Patent 2,651,669, according to which oxyhydrogen gas is evolved.

The object of evolving only oxygen is attained in the following manner:

The storage battery to be sealed, as shown in the drawings, consists of a housing in which are disposed a positive and a negative electrode, a separator which is disposed between the opposed electrode surfaces of unequal polarity and an alkaline electrolyte which is kept mainly in the pores of the electrodes and those of the separator by capillary action. Also provided are gas collection areas. In these areas, parts of the electrodes are in contact with the gases to be removed, i.e., oxygen. For this purpose, parts of the negative electrode are exposed, i.e., they are covered by neither a separator nor a mobile electrolyte, but are merely coated with a very fine film of the electrolyte.

These exposed portions of the electrode preferably consist of nickel or a nickel-clad metal. The contact with the gas area covers a comparatively large surface, as can be seen from the following consideration: The contact surface usually is approximately as large as the electrode surface covered by the electrolyte, but should never be less than 10 percent thereof.

The electrodes are porous which insures a saturation of the electrodes with electrolyte and also a fine coating with electrolyte of the exposed portions of the electrode. This coating is required for the establishment of the so-called tri-phase equilibrium, viz., Solid—metal, preferably nickel
Liquid—alkaline electrolyte (KOH, density 1.2)
Gaseous—oxygen This is a prerequisite for the removing of the oxygen.

Heretofore, it has been customary to discharge a gas-tight accumulator with such an amperage that its capacity is depleted in approximately 10 hours. If the accumulator has a capacity of 10 ampere-hours (ah.), the discharge current and also the charging current are 1 ampere. It also has been customary, as shown, e.g., in U.S. Patent 2,651,669, in order to charge the battery fully, to apply, after discharge, a charging factor of 1.4, i.e., if a discharge of 10 ah. was applied, the charge should be 10 ah.×1.4.

Such charge is insufficient for the formation of storage batteries before sealing according to the present invention, because it has been found that in that case portions of the positive electrode still can be charged further. The reason for this is that in the positive electrode, whose active mass is nickel hydroxide, upon charging not only trivalent nickel hydroxide is formed, but also, after extended charging, tetravalent nickel oxide. While this is of no consequence in open batteries, charged in the usual manner, it interferes with the action of gas-tight alkaline accumulators. When, in the latter, the negative electrode is fully charged, i.e., when all the energy applied to it is used exclusively for the development of hydrogen, and if simultaneously the positive electrode can still accumulate energy under formation of tetravalent nickel oxide, an equivalent amount of hydrogen must form in a gas-tight alkaline storage battery also if all the oxygen developed by the positive electrode at this state of charge, is removed by electrochemical reaction at the negative electrode, preferably at exposed portions of the latter.

To overcome this, it has been suggested, e.g., in U.S. Patent 2,571,927, to impart to the negative electrode a larger charging capacity than to the positive electrode. For that purpose, the difference in the charging capacities of both those electrodes is made larger than usual. This results in a harmful increased expenditure of active mass for the negative electrode which requires additional space in the battery.

For the formation of gas-tight accumulators in which only oxygen is evolved and simultaneously removed and to overcome all the above disadvantages, one charges the battery, according to the present invention, as follows:

The accumulator is filled with the electrolyte (KOH, density 1.2) and is charged with the amount of current at which the capacity of the charged battery would be exhausted in 10 hours for more than $10 \times 1.4$ hours, namely for $10 \times 2$ to $10 \times 10$ hours. Charging time, therefore, is 20 to 100 hours. If a larger or smaller amperage is selected for a 10 hour discharge rate, the charging time is correspondingly lengthened or shortened, respectively. This is shown more specifically in the following examples.

*Example 1*

The storage battery is constructed as shown in the drawings and has a capacity of 10 ah. The accumulator, not yet formed, is filled with the electrolyte and then is charged with a current of 1 a. for 50 hours. Thereafter, the freely moving electrolyte is removed so that only the immobilized part of the electrolyte remains which is kept in the pores of the electrodes and those of the separators by capillary action. The accumulator is then sealed.

*Example 2*

In the same kind of battery, the charging amperage is 0.5 a. at a capacity of 10 ah. Charging is effected over a period of 150 hours, whereafter the electrolyte is removed and the battery sealed.

*Example 3*

The charging amperage is 2 a. at a capacity of 10 ah. The accumulator is charged for 25 hours at 2 a., the electrolyte removed and the battery sealed.

In a special embodiment according to the present invention, the accumulator is partly or fully discharged before removal of the electrolyte and gas-tight sealing. This procedure may be applied to any one of the above examples.

Figure 5:
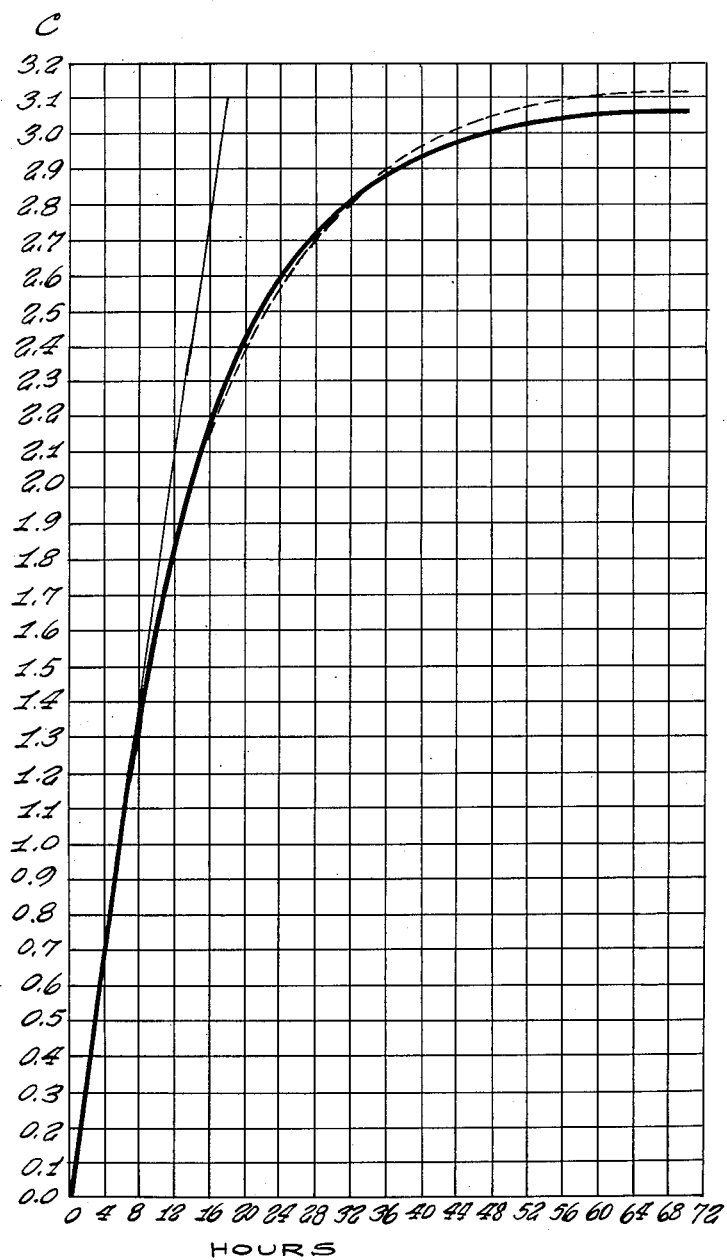
FIG. 5 is a graph showing the charge on the positive electrode of a gas-tight battery, fully charged before sealing.
Figure 6:
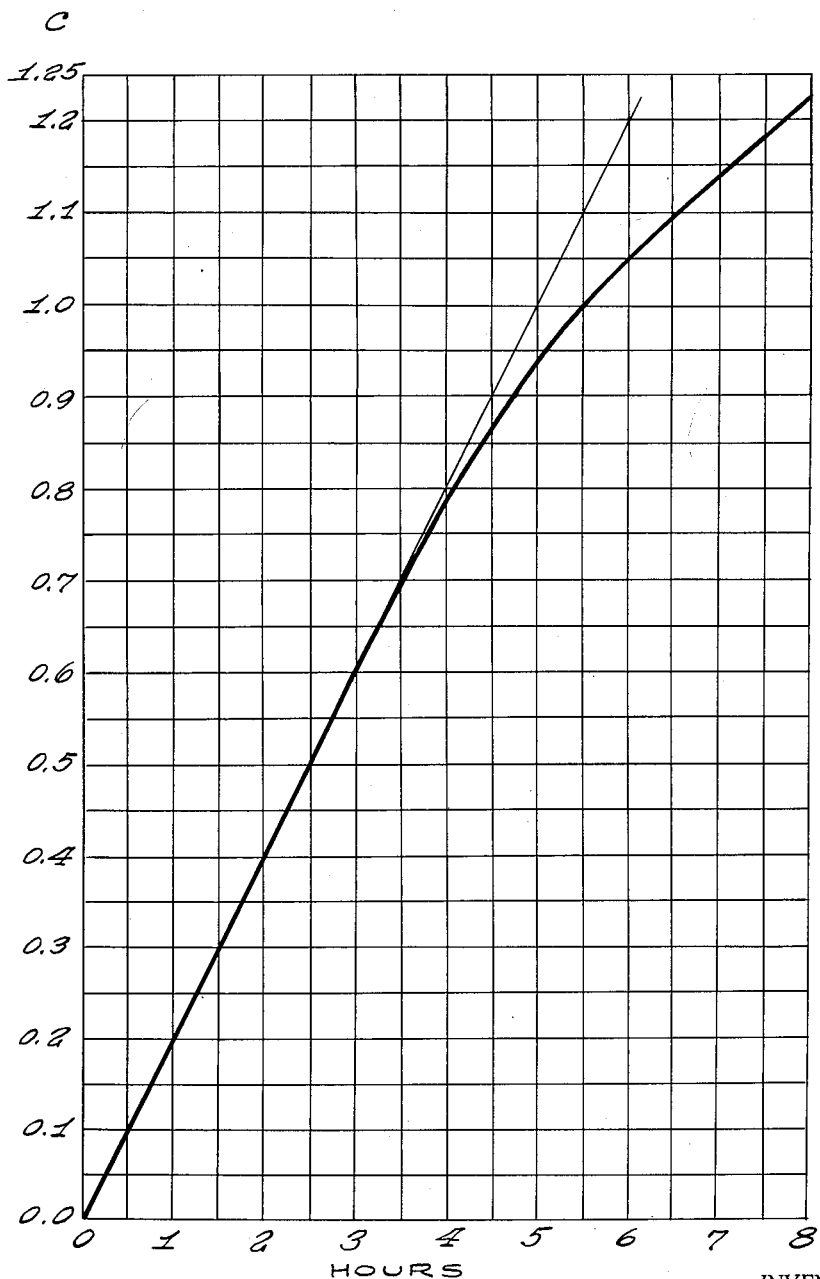
FIG. 6 is a graph showing the charge on the positive electrode of an open alkaline battery, not to be sealed gas-tight.

The difference in the effects obtained by charging open accumulators and those according to the present invention is further demonstrated in FIGS. 5 and 6, respectively.

Charging of the positive electrodes of open accumulators is shown in the graph of FIG. 6, wherein the ordinate shows the current charge in multiples of the capacity, $C=4.5$ ah., and the abscissa shows the charging time in hours. The quantity of current used for charging is represented by the fine line, the current accumulated on the electrode by the heavy line. The latter differs by approximately 3 charging hours from the former. This difference is caused by the onset of oxygen evolution which increases with the time, so that the curve showing the stored ampere-hours diverges increasingly from the curve showing the current expended.

The normal charging factor, as has been set forth above, is 1.4 times the discharge capacity. Since, according to FIG. 6, the cell is charged with 0.9 a., equal to a 5 hour discharge, charging normally is discontinued after 7 hours. In this instance, $1.4 \times C$ ah. have been applied to the cell, however, actually stored are only $1.14 \times C$ ah. The difference, $0.26 \times C$ ah., is oxygen which has escaped irreversibly.

The curve for the stored ampere-hours still climbs considerably after 7 hours. This indicates that charging could be continued and more current could be stored, yet with increasing loss.

A battery charged in that manner for 7 hours is generally considered fully charged because it will serve its purpose and further charging would be uneconomical. However, the battery actually is not fully utilized as has been shown. If a gas-tight accumulator were sealed in that state, the positive electrode would still have storage capacity and a surplus of hydrogen would have to evolve if charging were continued past 7 hours, which cannot always be avoided. This is because the negative electrode then is fully charged, whereas the positive electrode still has charging capacity so that harmful hydrogen must evolve as the equivalent for the remaining charging capacity of the positive electrode.

In order to avoid this, gas-tight accumulators, according to the present invention, are charged for an extended period of time in order to really fully charge the battery as indicated in FIG. 5. In the latter, the abscissa and the ordinate show the same features as FIG. 6.

In FIG. 5, the graph of the stored ampere-hours curves increasingly and finally proceeds horizontally. That means that gas-tight accumulators must be charged up to that time, i.e., to such a state of charge, in order to be able to seal them hermetically. In that case, it is no longer possible that after discharge and recharge hydrogen evolves because the positive electrode had attained its highest charging capacity before gas-tight sealing and because in every state of charge of the positive electrode there is an equivalent amount of uncharged parts on the negative electrode.

When the positive electrode is fully charged and thus all further energy applied to the same is used for the evolution of oxygen, the negative electrode is likewise fully charged. The oxygen produced, due to the removal of the freely moving electrolyte, is conducted to the exposed portions of the electrode and reacts electrochemically. Because all energy applied to the positive electrode is used for the evolution of oxygen and because all this oxygen is removed by the negative electrode, preferably by the exposed portions of the latter, so that evolution of oxygen and removing of the same correspond to another, the evolution of hydrogen thus is precluded.

The removal of oxygen proceeds rapidly, immediately after its evolution. Thereby, the negative electrode is depolarized to such an extent that the potential of a hydrogen evolution cannot be attained. Through this action of the oxygen together with the exposed portions of the negative electrode, an excess capacity of the negative electrode is unnecessary. This, however, is the case only when both electrodes are fully charged before the accumulator is sealed gas-tight.

What I claim is:

1. A method of forming a battery of the type of permanently sealed alkaline storage batteries containing in a housing at least one porous positive electrode including nickel hydroxide as active mass and at least one porous negative electrode including an active material consisting of cadmium mass, a porous separator interposed between adjacent electrodes of opposite polarity and an alkaline electrolyte immobilized in said porous electrodes and separator and when in operative condition substantially free of free-flowing electrolyte, comprising the steps of at least substantially filling said housing with freely moving electrolyte; fully charging said battery while still in unsealed condition with a number of ampere hours at least equal to the discharge capacity of said battery expressed in ampere hours multiplied by a charging factor of at least the magnitude of 3; removing said freely moving electrolyte thus retaining in the battery substantially only the portion of the electrolyte held in the pores of said electrodes and separator and forming a fine coating on said electrodes, whereby upon permanent sealing of said battery the same will be in operative condition and during subsequent charging of the same harmful over-pressure due to gas formation upon over-charging is prevented.

2. The method according to claim 1, wherein the positive electrode contains an active material consisting of nickel hydroxide, the negative electrode contains an active material consisting of cadmium mass, and the electroylte consists of an aqueous potassium hydroxide solution having a density of about 1.2.

3. A method of forming a battery of the type of permanently sealed alkaline storage batteries containing in a housing at least one porous positive electrode including nickel hydroxide as active mass and at least one porous negative electrode including an active material consisting of cadmium mass, a porous separator interposed between adjacent electrodes of opposite polarity and an alkaline electrolyte immobilized in said porous electrodes and separator and when in operative condition substantially free of free-flowing electrolye, comprising the steps of at least substantially filling said housing with freely moving electrolyte; fully charging said battery while still in unsealed condition with a number of ampere hours at least equal to the discharge capacity of said battery expressed in ampere hours multiplied by a charging factor of at least the magnitude of 3; removing said freely moving electrolyte thus retaining in the battery substantially only the portion of the electrolyte held in the pores of said electrodes and separator and forming a fine coating on said electrodes; and sealing said battery, whereby said battery will be placed in operative condition and in case of overcharging of the sealed battery harmful gas formation is prevented.

4. A method of forming a battery of the type of permanently sealed alkaline storage batteries containing in a housing at least one porous positive electrode including nickel hydroxide as active mass and at least one porous negative electrode including an active material consisting of cadmium mass, a porous separator interposed between adjacent electrodes of opposite polarity and an alkaline electrolyte immobilized in said porous electrodes and separator and when in operative condition substantially free of free-flowing electrolyte, comprising the steps of at least substantially filling said housing with freely moving electrolyte; fully charging said battery while still in unsealed condition with a number of ampere hours at least equal to the discharge capacity of said battery expressed in ampere hours multiplied by a charging factor of between about 3 and 10; removing said freely moving electrolyte thus retaining in the battery substantially only the portion of the electrolyte held in the pores of said electrodes and separator and forming a fine coating on said electrodes; and sealing said battery, whereby said battery will be placed in operative condition and in case of overcharging of the sealed battery harmful gas formation is prevented.

5. A method of forming a battery of the type of permanently sealed alkaline storage batteries containing in a housing at least one porous positive electrode including nickel hydroxide as active mass and at least one porous negative electrode including an active material consisting of cadmium mass, a porous separator interposed between adjacent electrodes of opposite polarity and an alkaline electrolyte immobilized in said porous electrodes and separator and when in operative condition substantially free of free-flowing electrolyte, comprising the steps of at least substantially filling said housing with freely moving electrolyte; fully charging said battery while still in unsealed condition with a number of ampere hours at least equal to the discharge capacity of said battery expressed in ampere hours multiplied by a charging factor of between about 5 and 7.5; removing said freely moving electrolyte thus retaining in the battery substantially only the portion of the electrolyte held in the pores of said electrodes and separator and forming a fine coating on said electrodes; and sealing said battery, whereby said battery will be placed in operative condition and in case of overcharging of the sealed battery harmful gas formation is prevented.

6. A method of forming a battery of the type of permanently sealed alkaline storage batteries containing in a housing at least one porous positive electrode including nickel hydroxide as active mass and at least one porous negative electrode including an active material consisting of cadmium mass, a porous separator interposed between adjacent electrodes of opposite polarity and an alkaline electrolyte immobilized in said porous electrodes and separator and when in operative condition substantially free of free-flowing electrolyte, comprising the steps of at least substantially filling said housing with freely moving electrolyte; fully charging said battery while still in unsealed condition with a number of ampere hours at least equal to the discharge capacity of said battery expressed in ampere hours multiplied by a charging factor of at least the magnitude of 3; removing said freely moving electrolyte thus retaining in the battery substantially only the portion of the electrolyte held in the pores of said electrodes and separator and forming a fine coating on said electrodes; fully discharging said battery, said removing of said freely moving electrolyte and said discharging of said battery being carried out in any desired sequence; and sealing said battery, whereby said battery will be placed in operative condition and in case of overcharging of the sealed battery harmful gas formation is prevented.

7. A method of forming a battery of the type of permanently sealed alkaline storage batteries containing in a housing at least one porous positive electrode including nickel hydroxide as active mass and at least one porous negative electrode including an active material consisting of cadmium mass, a porous separator interposed between adjacent electrodes of opposite polarity and an alkaline electrolyte immobilized in said porous electrodes and separator and when in operative condition substantially free of free-flowing electrolyte, comprising the steps of at least substantially filling said housing with freely moving electrolyte; fully charging said battery while still in unsealed condition with a number of ampere hours at least equal to the discharge capacity of said battery expressed in ampere hours multiplied by a charging factor of at least the magnitude of 3; removing said freely moving electrolyte thus retaining in the battery substantially only the portion of the electrolyte held in the pores of said electrodes and separator and forming a fine coating on said electrodes; at least partially discharging said battery, said removing of said freely moving electrolyte and said discharging of said battery being carried out in any desired sequence; and sealing said battery, whereby said battery will be placed in operative condition and in case of overcharging of the sealed battery harmful gas formation is prevented.

8. A method of forming a battery of the type of permanently sealed alkaline storage batteries containing in a housing at least one porous positive electrode including nickel hydroxide as active mass and at least one porous negative electrode including an active material consisting of cadmium mass, a porous separator interposed between adjacent electrodes of opposite polarity and an alkaline electrolyte immobilized in said porous electrodes and separator and when in operative condition substantially free of free-flowing electrolyte, comprising the steps of at least substantially filling said housing with freely moving electrolyte; fully charging said battery while still in unsealed condition with a number of ampere hours at least equal to the discharge capacity of said battery expressed in ampere hours multiplied by a charging factor of between about 5 and 7.5; removing said freely moving electrolyte thus retaining in the battery substantially only the portion of the electrolyte held in the pores of said electrodes and separator and forming a fine coating on said electrodes; at least partially discharging said battery; and sealing said battery, said removing of said freely moving electrolyte and said discharging of said battery being carried out in any desired sequence, whereby said battery will be placed in operative condition and in case of overcharging of the sealed battery harmful gas formation is prevented.

References Cited in the file of this patent

UNITED STATES PATENTS

| | | |
|---|---|---|
| 1,468,259 | Carpenter | Sept. 18, 1923 |
| 2,571,927 | Neumann et al. | Oct. 16, 1951 |
| 2,634,303 | Moulton | Apr. 7, 1953 |
| 2,798,110 | Peters | July 2, 1957 |
| 2,855,451 | Piroux | Oct. 7, 1958 |

FOREIGN PATENTS

| | | |
|---|---|---|
| 755,547 | Great Britain | Aug. 22, 1956 |
| 383,201 | Great Britain | Nov. 10, 1932 |

OTHER REFERENCES

Vesta Battery Corporation, pamphlet, "The Vesta, Twelve Eight," vol. 9, No. 3, May-June, 1925, pp. 1-3.